United States Patent

[11] 3,603,270

[72] Inventor Frank P. Tangel
Oakland, N.J.
[21] Appl. No. 831,573
[22] Filed June 9, 1969
[45] Patented Sept. 7, 1971
[73] Assignee Buitoni Foods Corporation

[54] MACHINE FOR MAKING FILLED DOUGH PRODUCTS
20 Claims, 5 Drawing Figs.

[52] U.S. Cl. ..................................... 107/1 R,
107/54, 107/69
[51] Int. Cl. .................................... A23g 3/00
[50] Field of Search ........................... 107/1, 15,
54, 68, 69

[56] References Cited
UNITED STATES PATENTS
2,714,861 8/1955 Castronuovo ............... 107/69

*Primary Examiner*—Louis K. Rimrodt
*Attorney*—Lavine, Cantor & Reich

ABSTRACT: A machine for making filled dough products having two dough hoppers for delivering two dough sheets, between which is a filling hopper. The dough sheets pass to cutter-crimper rollers having pockets which receive the dough sheets and filling, crimp the dough sheets together around the filling, and sever the product from the remaining dough sheet, which is then scrap. The cutter-crimper rollers have a slower peripheral velocity than the final dough rollers. Oil spray nozzles provide lubrication for the cutter-crimper rollers. A receiving belt receives the composite sheet of products and the scrap dough sheet from the cutter-crimper rollers. A series of conveyors separates the scrap dough sheet from the products and delivers it to the dough hoppers.

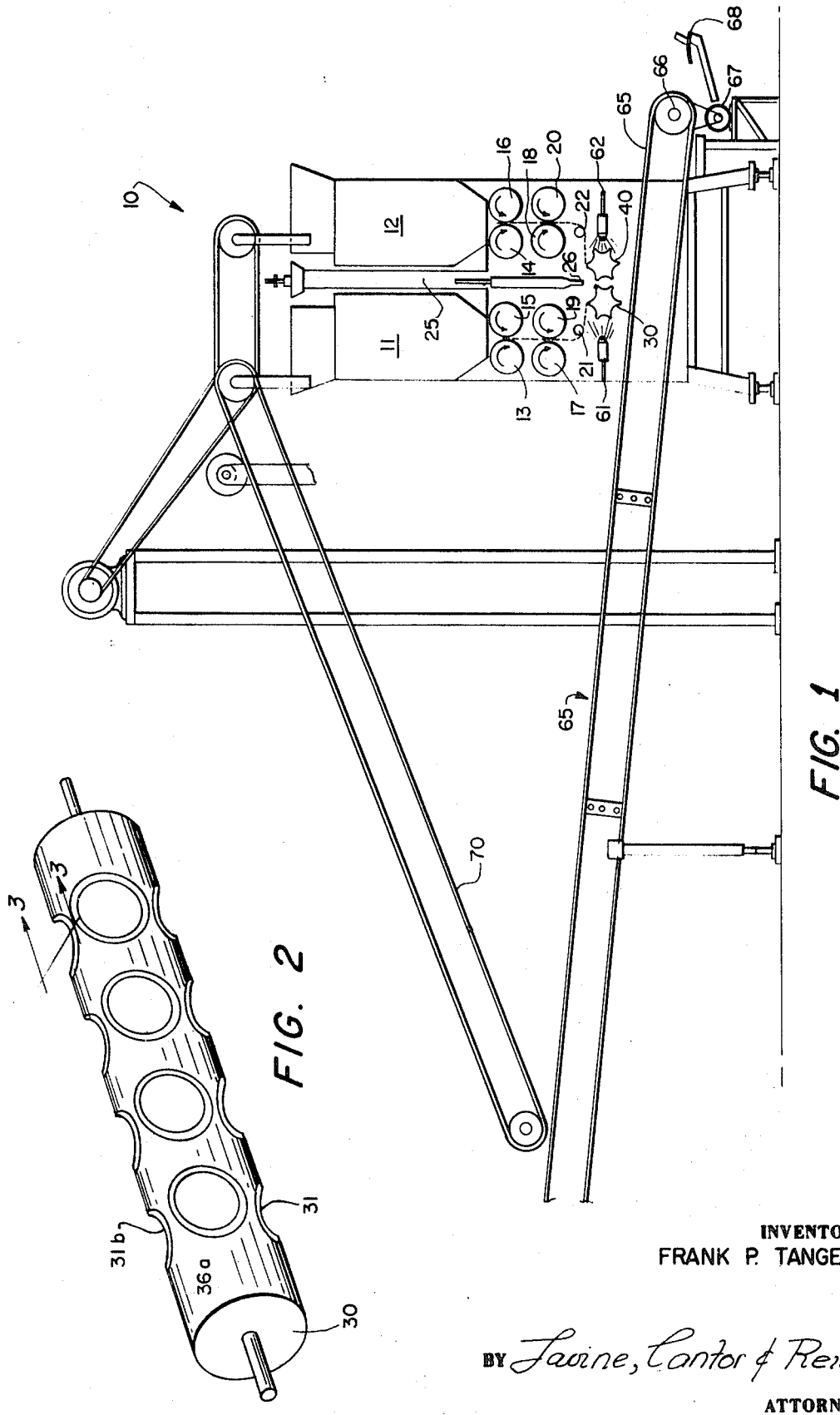

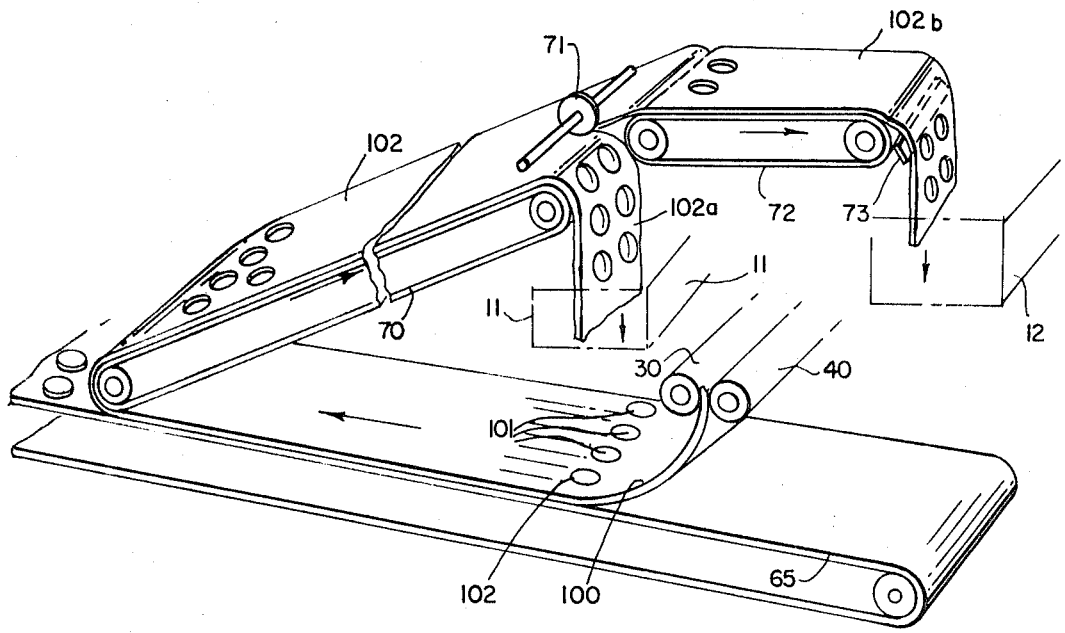
FIG. 5
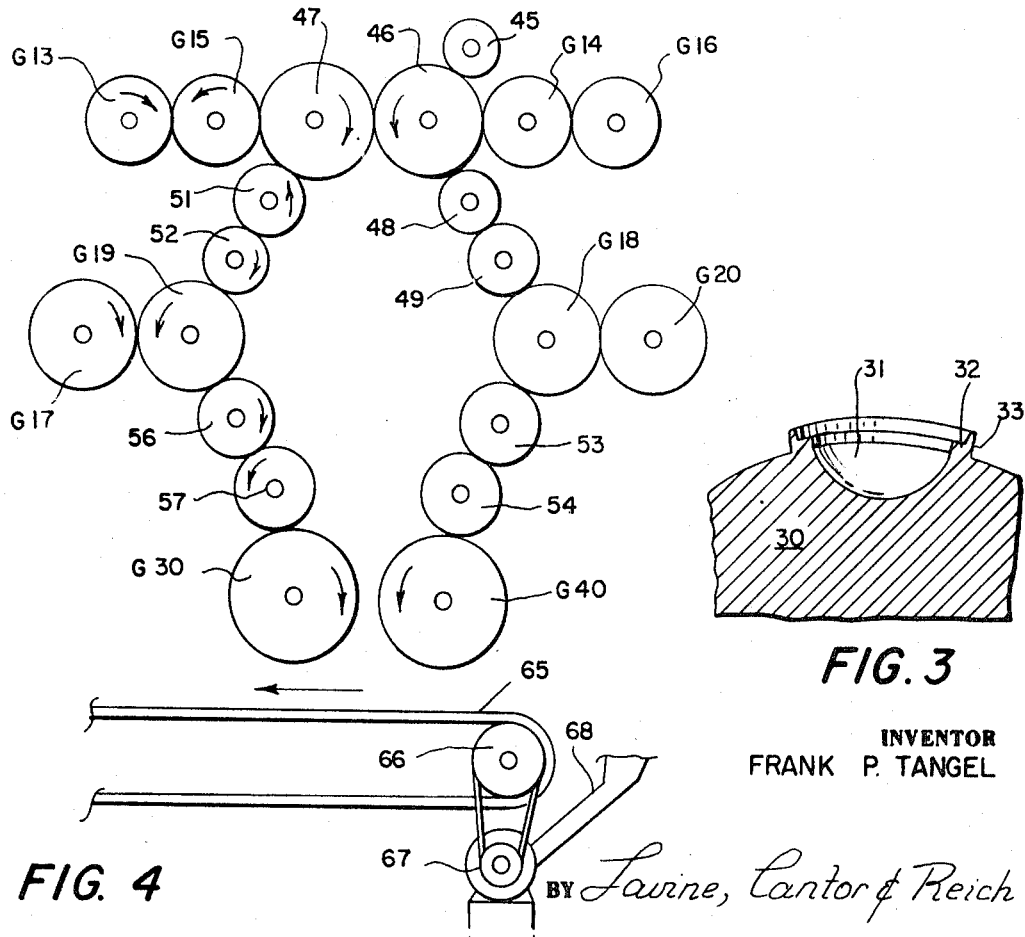
FIG. 3
FIG. 4
INVENTOR
FRANK P. TANGEL
BY Lavine, Cantor & Reich
ATTORNEYS

MACHINE FOR MAKING FILLED DOUGH PRODUCTS

BACKGROUND OF THE INVENTION

The present invention pertains to a machine for forming filled dough products having two dough layers forming a pocket, within which is filling material.

Filled dough products such as ravioli, which comprise two dough layers forming a pocket in which is a suitable filling were initially made by hand, the dough being rolled into sheets, filling placed at spaced locations on a bottom sheet, and then a top dough sheet placed over the bottom dough sheet. Then the two dough sheets were crimped together in surrounding relationship to each mass of filling, and the product was simultaneously or subsequently severed from the dough sheet, as by the use of a cutter device. In order to produce such products at a faster rate than could be achieved by hand, and to save labor costs, a machine has been provided which included a pair of dough hoppers having rollers at the bottom for extruding two sheets of dough. A filling hopper was between the two dough hoppers. The dough sheets were led to the nip of a pair of rollers, these being pressure and die rollers, one of which had a series of peripherally spaced pockets. The filling material was also delivered into the nip of the rollers, so that there was thereby provided a ravioli product comprising two dough sheets between which was filling contained in a pocket. A third roller was provided having knives, which severed the individual ravioli, which then fell upon an inclined chute.

Such a machine as described above, and disclosed in Pat. No. 2,001,792 was adapted for the making of disclike pizza products, comprising two dough layers with a filling between them of a material consisting primarily of tomato sauce and cheese. A number of problems were encountered, including the inability of the machine to produce products which were round. This was due to the fact, it was discovered, that the dough was stretched when passed through the dough rollers, and thereafter this dough shrank back in a nonuniform manner, resulting in products which were not of the desired disclike configuration: it was also found that the dough did not conform to the shape of the pockets in the rollers, thereby resulting in defective products. Further, in the manufacture of the products on a suitably economical basis, the cutter-crimper rollers were provided of such lengths that a plurality, for example four, of the products were aligned across the dough sheet. This resulted in the delivery of a composite sheet made up of products which, while being substantially severed from the surrounding dough, were still in position within the surrounding dough, which is herein referred to as scrap dough. Consequently, a chute configuration heretofore known for receiving the products from the forming rollers was not satisfactory for receiving the composite dough sheet from the cutter-crimper rollers. Further, it was noted that there was an unsatisfactory sticking of the dough to the cutter-crimper rollers, resulting in unsatisfactory operation and the spoiling of products. Still further, the relatively large amount of scrap dough generated from the machine created a problem in the separation of the scrap dough from the products, and in connection with the handling of the resulting large quantity of scrap dough.

SUMMARY OF THE INVENTION

The present invention machine for making filled dough products provides a pair of dough hoppers having rollers at the bottoms thereof for extruding two sheets of dough. Between the dough hoppers is a filling material hopper. The two sheets of dough are led to a pair of cutter-crimper rollers, at least one of which is provided with peripherally spaced pockets into which portions of one of the dough sheets is positioned in order to conform to the configuration thereof, with the filling material added into this thus formed pocket. The two dough sheets are brought together so as to enclose the filling, the dough sheets being crimped to join them about the filling, and are also being severed about the filled product. The cutter-crimper rollers are driven at a peripheral speed which is slightly slower than the peripheral speed of the final dough extruding rollers, in order to permit the dough to shrink back from its extruded, stretched condition when leaving the final dough rollers, to thereby produce products of the desired disclike configuration. The cutter-crimper rollers are sprayed with a lubricating oil, of suitable edible quality, so as to prevent the undesired adherence of the dough to the cutter-crimper rollers. In order to handle the composite dough sheet, comprising products and scrap dough being delivered by the cutter-crimper rollers, a receiving conveyor is provided, which is driven at a slightly faster velocity than the peripheral velocity of the cutter-crimper rollers. The composite sheet of scrap dough and products being on the receiving conveyor, the scrap dough sheet is removed from this conveyor by a conveyor which overlies the receiving conveyor, is at an acute angle thereto, and is driven in the opposite direction to the receiving conveyor, the construction providing for removal of the scrap dough sheet, perforated in rows and columns, while permitting the disclike products to remain on the receiving conveyor for further delivery and processing. The noted conveyor is inclined upwardly, and delivers the scrap dough sheet back to one of the dough hoppers, a knife being provided to longitudinally divide the scrap dough sheet, another conveyor being provided to receive a part of the divided scrap dough sheet and to convey it to the other of the dough hoppers.

It will therefore be seen that among the objects of the present invention are to provide a machine of the noted type which will provide for the manufacture of products having the desired shape and size, and in particular an object of the present invention is to provide a machine in which a cutter-crimper roller pair is provided having generally circular pocket-forming means thereon and which will produce essentially disclike products having the appropriate amount of filling. Another object of the present invention is to provide a machine of the noted type in which the sticking of the dough to the cutter-crimper rollers is obviated. Yet another object of the present invention is to provide a machine of the above type which will receive the composite sheet from the cutter-crimper rollers, and will remove the composite sheet made up of the scrap dough and products at a satisfactorily rapid rate. Yet another object of the present invention is the provision of such a machine as described hereinabove which will remove the scrap dough sheet and return it to the dough hoppers for reuse, without the necessity of handling of the scrap dough by workers.

BRIEF DESCRIPTION OF THE DRAWINGS

FIG. 1 is an elevational view, with parts broken away, of a machine for making filled dough products in accordance with the present invention.

FIG. 2 is a perspective view of a cutter-crimper roller forming part of the machine of FIG. 1.

FIG. 3 is a cross-sectional view taken on the line 3—3 of FIG. 2.

FIG. 4 is a schematic view showing part of the drive system of the machine of FIG. 1.

FIG. 5 is a perspective view of the scrap dough separating and return system of the present invention.

DESCRIPTION OF THE PREFERRED EMBODIMENT

Referring now to the drawings, wherein like or corresponding reference numerals are used to designate like or corresponding parts throughout the several views, there is shown in FIG. 1 a machine 10 comprising a pair of spaced hoppers 11 and 12 into which dough is placed. The dough hopper 11 has at the bottom thereof a pair of dough rollers 13 and 15 which serve to extrude dough therefrom in sheet form. The dough hopper 12 which, like dough hopper 11, is open at the top, has a corresponding pair of dough rollers 14 and 16 at the bottom thereof for extruding a second sheet of dough. Beneath the dough rollers 13 and 15 is a final pair of dough rollers 17 and 19, and below them is a guide roller 21. In similar manner, below the dough rollers 14 and 16 are a pair of final dough rollers 18 and 20, below which is a guide roller 22.

The four pairs of dough rollers hereinabove described are driven in the directions indicated by the arrows thereon, and serve to both extrude the dough from the hoppers, and as a necessary consequence thereof, also stretch the dough, in generally the same manner that occurs when a sheet of dough is rolled by the common rolling pin.

Between the dough hoppers 11 and 12 is a hopper 25 for filling material which, in the present instance, is preferably a mixture to tomato sauce and cheese, together with other ingredients. The filling hopper 25, which may be of known construction, terminates in a delivery nozzle 26, which is directed into the nip between a pair of driven crimper-cutter rollers 30 and 40.

Referring now to FIG. 2, there may be seen the cutter-crimper roller 30, it being understood that the cutter-crimper roller 40 is substantially identical to it. The cutter-crimper roller 30 is basically of cylindrical construction, and has a series of pockets 31, 31a, 31b, etc. formed peripherally thereabout. As shown, there are four rows of these pockets 31 along the length of the cutter-crimper roller 30, although as many or as few rows of pockets may be provided as desirable. As shown in FIG. 3, the pocket 31 is a relatively gentle depression in the cylinder 30, and is surrounded by a raised crimping element 32 which is slightly above the basic surface of the roller 30. Cutter-crimper roller 40 is substantially identical to the cutter-crimper roller 30 in that it has a series of pockets of like size which are similarly positioned on the roller 40, and each of the pockets in the roller 40 has surrounding it, in similar manner, a crimper element corresponding to crimper element 32, and which will, in each instance, cooperate with the mating crimper element 32 in order to crimp or press the dough between them to thereby provide a sealing engagement between the two dough sheets in surrounding relationship to the filling. The roller 30 in addition, and unlike the roller 40, is provided with a cutter 33 which surrounds the crimper element 32, and which will, in like manner, surround the corresponding crimper element of the cutter-crimper roller 40 as corresponding pockets on the two rollers pass in mating relationship. By this construction, not only are the two dough sheets joined and sealed in a circle which extends around the filling in each of the products, but in addition the cutters 33 serve to substantially sever the product from the two dough sheets which are in engaging face-to-face relationship.

Referring now to FIG. 4, there is shown an exemplary gearing arrangement for the various rollers hereinabove described, certain of the gears being designated by the letter G, followed by the reference numeral of the roller which it drives. Hence, there may be seen the meshing gears G13 and G15 which drive the dough rollers 13 and 15, and the meshing gears G14 and G16 for the dough rollers 14 and 16. Power is supplied to these gears by a drive gear 45 and idlers 46 and 47. From idler 46, a pair of idlers 48 and 49 drive the gear G18, which is in mesh with the gear 20. Driven by idler 47 are the idlers 51 and 52, the latter of which drives the gear G19 which is in mesh with the gear G17, it being noted that the gears G17, G19, G18 and G20 respectively drive the dough rollers 17 and 19, and 18 and 20.

Gear G18 drives a pair of idlers 53 and 54, the latter being in mesh with gear G40, while gear G19 drives a pair of idlers 56 and 57, the latter being in mesh with the gear G30. The diameters of the above-noted gears and idlers and the diameters of the various rollers, particularly the final dough rollers 17 and 19, and 18 and 20, together with the diameters of the cutter-crimper rollers 30 and 40 are provided so that the peripheral velocity of the cutter-crimper rollers 30 and 40 is slightly less than the peripheral velocity of the final dough rollers 17, 19 and 18, 20, it being understood that these final dough rollers have a common peripheral velocity. By this construction, the stretching of the dough by the final dough rollers 17, 19 and 18, 20 is compensated for by the slower relative peripheral velocity of the cutter-crimper rollers 30 and 40, which slower velocity serves to substantially relax the stretch of the dough sheets after they have passed through the final dough rollers.

This relaxing of the stretch which had been created in the dough sheets is highly beneficial in that subsequent shrinkback, i.e., shrinkage of the dough, which would otherwise occur, is greatly minimized. This thereby effects the production of the finished products, comprising two dough layers forming a pocket in which is the above-noted tomato sauce and cheese filling, and prevents a significant change in shape of these products in the further processing of them, which processing includes baking. Another advantage which is derived from the relaxing which is achieved in the dough sheets is the ability of the dough sheets to conform substantially precisely to the pockets in the cutter-crimper rollers 30 and 40. With sheets of dough in a relaxed condition, as noted, they are able to line the pockets and to thereby take the shape of the pockets, with result that there is a substantially full size dough pocket to receive the filling material: the dough sheets if still stretched would tend to take configuration in the pockets closer to that of the outer surface of the cutter-crimper rollers, being out of contact with parts of the walls of the pockets, and thereby providing a pocket of lesser depth than intended. In such instances, the pockets were not able to receive the full measured charge of the filling material, with resulting unsatisfactory products.

Referring again to FIG. 1, spray nozzles 61 and 62 are provided, being directed towards the cutter-crimper rollers 30 and 40, respectively. These nozzles direct a fine spray of an edible lubricating oil onto the cutter-crimper rollers 30 and 40 to thereby prevent the sticking of the dough to the cutter-crimper rollers.

The composite dough sheet delivered by the cutter-crimper rollers 30 and 40 is received by an endless belt receiving conveyor 65 having a drive sprocket 66 at one end thereof (see FIG. 4) driven by an electric motor 67 which is controlled by a control device 68. The control device 68 is adjusted so that the linear velocity of the conveyor 65 is slightly greater than the peripheral velocity of the cutter-crimper rollers 30 and 40: this velocity relationship counteracts any residual shrinkback thereby assisting in shape retention and in product separation from scrap dough.

Referring now to FIG. 5, there is shown a composite dough sheet 100 being delivered form the cutter-crimper rollers 30 and 40, and comprising the two layers of scrap dough, in which are the products 101, each of which comprises upper and lower dough layers forming a pocket in which is the above-mentioned filling. The dough layers are sealed to each other in surrounding relationship to the filling, due to the above-mentioned crimping elements 32, and the products 101 are substantially severed from the scrap dough sheet 102, this being the above-mentioned two-layer dough sheet surrounding the products 101. While the products 101 have been substantially severed from the composite dough sheet 100, there is still sufficient frictional contact between the products and the scrap dough sheet 102 to cause the products to remain in place during the time, for example, when they are traversing the space between the cutter-crimper rollers 30 and 40 and the surface of the conveyor 65.

To provide for separation of the scrap dough sheet 102 from the products 101, there is provided an endless belt conveyor 70. Conveyor 70 lies above the receiving conveyor 65, extending upwardly at an acute angle therewith from a lower point where it is in proximity to the conveyor 65. It is driven in the opposite direction to conveyor 65, as indicated by the arrows. This construction provides for a lifting of the scrap dough sheet 102 from the conveyor 65, scrap dough sheet 102, as shown in FIG. 5, then being carried upwardly on the conveyor 70.

Conveyor 70 also serves as part of a scrap dough return system, which includes a knife 71 which divides the scrap dough sheet 102 longitudinally into two sheets, 102a and 102b. The upper end of conveyor 70 is positioned above the dough hopper 11, so that scrap dough sheet 102a is deposited into it. There is additionally provided a conveyor 72 which receives the scrap dough sheet 102b, its delivery end lying above the dough hopper 12, so that the scrap dough sheet 102b is deposited into dough hopper 12. There is associated with the conveyor 72 a scraper 73, and a similar scraper, not shown, is associated with the delivery end of conveyor 70: these scrapers serve to insure the removal of the scrap dough sheets from their respective conveyors. By this arrangement, the scrap dough resulting from the manufacture of the products 101 is returned automatically and without the intervention of manual labor to the dough hoppers, whereby this scrap dough is reused, being maintained in a completely sanitary condition.

There has been provided a machine for making filled dough products which, with the use of relatively easily manufactured cutter-crimper rollers having generally circular pockets, is able to produce products which remain substantially disclike or circular even when subjected to further processing, such as baking. Further, the present invention machine by presenting unstretched or relaxed dough sheets to the crimper-former rolls, is able to achieve conformity of the dough sheets with the pockets in the cutter-crimper rolls, to thereby provide for accurate and complete filling of the pockets, with resulting uniformity of the finished product. Hence, the present invention machine provides products of uniform weight and content, and of uniform circular or disclike shape.

The machine of the present invention obviates sticking of the dough to the cutter-crimper rollers, by the provision of oil spray nozzles which direct lubricating oil onto the cutter-crimper rollers. The receiving conveyor of the present invention is driven at a relatively greater velocity than that of the cutter-crimper rollers so as to provide for satisfactory removal of the composite sheets.

Further, the present invention machine provides for the ready and complete separation of the scrap dough from the composite dough sheet, so that the dough-containing products remain on a receiving conveyor. This separation of the scrap dough is achieved by a conveyor which is also utilized to return the scrap dough to the dough hoppers. Accordingly, it will be seen that the present invention machine provides a scrap-dough return conveyor system of simple construction and continuous, sanitary operation.

It will be obvious to those skilled in the art that various changes may be made without departing from the spirit of the invention and therefore the invention is not limited to what is shown in the drawings and described in the specification but only as indicated in the appended claims.

I claim:
1. A machine for manufacturing filled dough products comprising:
   means including two pairs of rollers for extruding two sheets of dough,
   a pair of mating rollers for receiving said two dough sheets in the nip therebetween, at least one said mating roller comprising pocket means for receiving a part of a said dough sheet, to thereby line said pocket means,
   means for introducing a filling material into said thus lined pocket means, and
   means for driving said dough rollers and said mating rollers with said mating rollers having a slower peripheral velocity than the peripheral velocity of said dough rollers whereby to permit dough extruded from said extruding rollers to shrink back from the stretched condition thereof resulting from passage of the dough through said extruding rollers.

2. A machine as set forth in claim 1, wherein both said mating rollers comprise pocket means.

3. A machine as set forth in claim 1, said machine having a pair of dough hoppers, each dough hopper having a pair of dough rollers at the bottom thereof, a pair of dough rollers being between the dough rollers in a said dough hopper and said mating rollers.

4. A machine as set forth in claim 1, said pocket means each being generally circular.

5. A machine as set forth in claim 1, and means for spraying liquid onto said mating rollers.

6. A machine as set forth in claim 5, said last-mentioned means comprising spray nozzles directed at each said mating roller.

7. A machine for manufacturing dough products comprising:
   means for delivering a dough sheet,
   means including a pair of mating rollers for deforming a dough sheet delivered thereto,
   moving means for receiving a dough sheet from said mating rollers, and
   means for moving said last-mentioned means at a higher velocity than the peripheral velocity of said mating rollers whereby to counteract shrink back in the dough sheet passing from said mating deforming rollers to said moving means.

8. A machine as set forth in claim 7, said moving means comprising on endless belt conveyor 9. A machine as set forth in claim 7, said means for delivering a dough sheet comprising dough roller means for extruding a sheet of dough.

10. The machine of claim 9, and means for driving said dough roller means at a higher peripheral velocity than the peripheral velocity of said mating rollers.

11. A machine for manufacturing dough products comprising:
   means for forming a composite sheet comprising a scrap dough sheet and dough-containing products severed therefrom and in positions in said scrap dough sheet,
   conveyor means for receiving said composite sheet from said forming means, and
   means for removing said scrap dough sheet from said conveyor means.

12. A machine as set forth in claim 11, said last-mentioned means comprising a conveyor having an endless belt, one end of said conveyor being adjacent said conveyor means.

13. A machine as set forth in claim 12, said conveyor being above said conveyor means.

14. A machine as set forth in claim 13, said conveyor being at an acute angle with said conveyor means.

15. A machine as set forth in claim 14, said composite sheet forming means comprising dough hopper means, and means for depositing scrap dough into said dough hopper means comprising said conveyor.

16. A machine for manufacturing dough products comprising:
   means for forming a composite sheet comprising a scrap dough sheet and dough-containing products severed therefrom and in position in said scrap dough sheet, said means comprising dough hopper means,
   means for receiving said composite sheet from said forming means, and
   means for separating said scrap dough sheet from said composite sheet and for conveying said scrap dough sheet to said dough hopper means.

17. A machine as set forth in claim 16, said receiving means comprising a conveyor.

18. A machine as set forth in claim 17, said separating and conveying means comprising a second conveyor above said receiving conveyor and moving in the opposite direction thereto.

19. A machine as set forth in claim 17, said dough hopper means comprising two dough hoppers, and said separating and conveying means comprising first conveyor means for receiving scrap dough and for depositing said scrap dough into one said dough hopper, and second conveyor means for receiving scrap dough and for depositing scrap dough into a second said dough hopper.

20. A machine as set forth in claim 18, said dough hopper means comprising two dough hoppers, said second conveyor extending to a point above one said dough hopper, means for longitudinally dividing said scrap dough sheet, and a third conveyor having a receiving end adjacent the discharge end of said second conveyor and a discharge end above the other said dough hopper.